United States Patent
Burtch

(10) Patent No.: US 8,979,708 B2
(45) Date of Patent: Mar. 17, 2015

(54) TORQUE CONVERTER CLUTCH SLIP CONTROL SYSTEMS AND METHODS BASED ON ACTIVE CYLINDER COUNT

(71) Applicant: GM Global Technology Operations LLC, Detroit, MI (US)

(72) Inventor: Joseph B. Burtch, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 90 days.

(21) Appl. No.: 13/798,384

(22) Filed: Mar. 13, 2013

(65) Prior Publication Data

US 2014/0194247 A1 Jul. 10, 2014

Related U.S. Application Data

(60) Provisional application No. 61/749,559, filed on Jan. 7, 2013.

(51) Int. Cl.
*F16H 61/00* (2006.01)
*F16H 61/14* (2006.01)
*F16D 33/18* (2006.01)

(52) U.S. Cl.
CPC .............. *F16D 33/18* (2013.01); *Y10S 477/902* (2013.01)
USPC ............................ 477/168; 477/180; 477/902

(58) Field of Classification Search
USPC ............. 477/70, 77, 79, 83, 86, 90, 166, 168, 477/169, 174, 176, 180, 902
See application file for complete search history.

(56) References Cited

U.S. PATENT DOCUMENTS

| | | | |
|---|---|---|---|
| 5,094,213 A | 3/1992 | Dudek et al. | |
| 5,423,208 A | 6/1995 | Dudek et al. | |
| 5,465,617 A | 11/1995 | Dudek et al. | |
| 5,669,354 A | 9/1997 | Morris | |
| 6,760,656 B2 | 7/2004 | Matthews et al. | |
| 7,100,720 B2 * | 9/2006 | Ishikawa | 180/65.26 |
| 7,292,231 B2 | 11/2007 | Kodama et al. | |
| 7,363,111 B2 | 4/2008 | Vian et al. | |
| 7,577,511 B1 | 8/2009 | Tripathi et al. | |
| 7,785,230 B2 * | 8/2010 | Gibson et al. | 477/62 |
| 7,849,835 B2 | 12/2010 | Tripathi et al. | |
| 7,886,715 B2 | 2/2011 | Tripathi et al. | |
| 7,930,087 B2 * | 4/2011 | Gibson et al. | 701/103 |
| 7,954,474 B2 | 6/2011 | Tripathi et al. | |
| 2008/0288146 A1 * | 11/2008 | Beechie et al. | 701/58 |
| 2010/0006065 A1 | 1/2010 | Tripathi et al. | |
| 2010/0010724 A1 | 1/2010 | Tripathi et al. | |
| 2010/0100299 A1 | 4/2010 | Tripathi et al. | |
| 2011/0048372 A1 | 3/2011 | Dibble et al. | |
| 2011/0208405 A1 | 8/2011 | Tripathi et al. | |
| 2011/0213540 A1 | 9/2011 | Tripathi et al. | |

(Continued)

OTHER PUBLICATIONS

U.S. Appl. No. 13/798,351, filed Mar. 13, 2013, Rayl.
U.S. Appl. No. 13/798,400, filed Mar. 13, 2013, Phillips.

(Continued)

*Primary Examiner* — Justin Holmes

(57) ABSTRACT

A torque converter clutch control system of a vehicle includes a target slip module and a slip control module. The target slip module determines a target torque converter clutch slip based on an average number of activated cylinders of an engine during a predetermined period. The slip control module controls a torque converter clutch based on the target torque converter clutch slip.

18 Claims, 4 Drawing Sheets

(56) References Cited

U.S. PATENT DOCUMENTS

2011/0213541 A1 9/2011 Tripathi et al.
2011/0251773 A1 10/2011 Sahandiesfanjani et al.

OTHER PUBLICATIONS

U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,737, filed Mar. 13, 2013, Beikmann.
U.S. Appl. No. 13/798,775, filed Mar. 13, 2013, Phillips.
U.S. Appl. No. 13/799,116, filed Mar. 13, 2013, Brennan.
U.S. Appl. No. 13/799,129, filed Mar. 13, 2013, Beikmann.
U.S. Appl. No. 13/799,181, filed Mar. 13, 2013, Beikmann.
U.S. Appl. No. 14/211,389, file Mar. 14, 2014, Liu et al.
U.S. Appl. No. 14/300,469, filed Jun. 10, 2014, Li et al.
U.S. Appl. No. 14/310,063, filed Jun. 20, 2014, Wagh et al.
U.S. Appl. No. 14/449,726, filed Aug. 1, 2014, Hayman et al.

* cited by examiner

TORQUE CONVERTER CLUTCH SLIP CONTROL SYSTEMS AND METHODS BASED ON ACTIVE CYLINDER COUNT

CROSS-REFERENCE TO RELATED APPLICATIONS

This application claims the benefit of U.S. Provisional Application No. 61/749,559, filed on Jan. 7, 2013. The disclosure of the above application is incorporated herein by reference in its entirety.

This application is related to U.S. patent application Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,536 filed on Mar. 13, 2013, Ser. No. 13/798,435 filed on Mar. 13, 2013, Ser. No. 13/798,471 filed on Mar. 13, 2013, Ser. No. 13/798,737 filed on Mar. 13, 2013, Ser. No. 13/798,701 filed on Mar. 13, 2013, Ser. No. 13/798,518 filed on Mar. 13, 2013, Ser. No. 13/799,129 filed on Mar. 13, 2013, Ser. No. 13/798,540 filed on Mar. 13, 2013, Ser. No. 13/798,574 filed on Mar. 13, 2013, Ser. No. 13/799,181 filed on Mar. 13, 2013, Ser. No. 1799,116 filed on Mar. 13, 2013, Ser. No. 13/798,624 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to vehicle powertrains and more specifically to torque converter clutch control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Under some circumstances, one or more cylinders of an engine may be deactivated. Deactivation of a cylinder may include deactivating opening and closing of intake valves of the cylinder and halting fueling of the cylinder. One or more cylinders may be deactivated, for example, to decrease fuel consumption when the engine can produce a requested amount of torque while the one or more cylinders are deactivated.

SUMMARY

A torque converter clutch control system of a vehicle includes a target slip module and a slip control module. The target slip module determines a target torque converter clutch slip based on an average number of activated cylinders of an engine during a predetermined period. The slip control module controls a torque converter clutch based on the target torque converter clutch slip.

A torque converter clutch control method includes determining a target torque converter clutch slip based on an average number of activated cylinders of an engine during a predetermined period. The torque converter clutch control method further includes controlling a torque converter clutch based on the target torque converter clutch slip.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Internal combustion engines combust an air and fuel mixture within cylinders to generate torque. Under some circumstances, an engine control module (ECM) may deactivate one or more cylinders of the engine. The ECM may deactivate one or more cylinders, for example, to decrease fuel consumption when the engine can produce a requested amount of torque while the one or more cylinders are deactivated.

The engine outputs torque to a transmission via a torque converter. A torque converter clutch controls torque converter clutch slip. Torque converter clutch slip may refer to a difference between an engine speed and a torque converter turbine speed. A transmission control module may determine a target value for the torque converter clutch slip and control the torque converter clutch based on the target value.

Deactivation of one or more cylinders may increase powertrain-induced vibration relative to the activation of all of the cylinders. The transmission control module therefore determines the target value based on an average number of activated cylinders over a predetermined period, such as a predetermined number of engine cycles. The average number of activated cylinders over the predetermined period may be referred to as an effective cylinder count. Determining the target value based on the effective cylinder count may decrease noise and vibration (N&V) associated with the deactivation of one or more cylinders. For example only, the transmission control module may increase the target value as the effective cylinder count decreases and vice versa.

Figure 1:
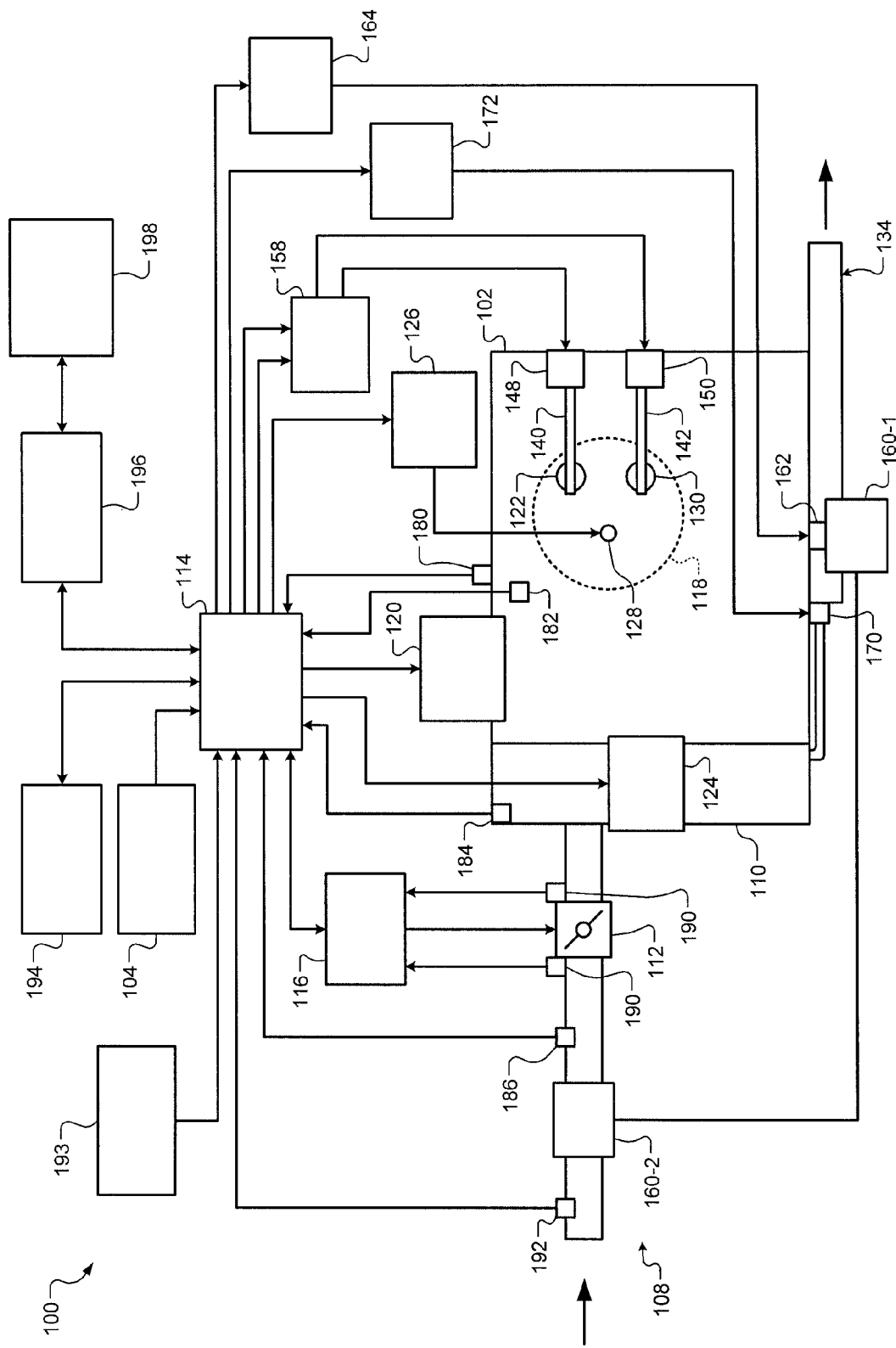
FIG. 1 is a functional block diagram of an example engine system according to the present disclosure.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle. The four strokes, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented.

The cylinder actuator module 120 may deactivate the cylinder 118 by disabling opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. A temperature of engine coolant may be measured using an engine coolant temperature (ECT) sensor

182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively.

The ECM 114 may control the actuator values in order to cause the engine 102 to generate a target torque. The ECM 114 may determine the target torque, for example, based on one or more driver inputs, such as an accelerator pedal position, a brake pedal position, a cruise control input, and/or one or more other suitable driver inputs. The ECM 114 may determine the target torque additionally or alternatively based on one or more torque requests, such as torque requests generated by the ECM 114 and/or torque requests received from other modules of the vehicle, such as the transmission control module 194, the hybrid control module 196, a chassis control module, etc.

The ECM 114 may determine target actuator values based on the target torque and control the engine actuators based on the target actuator values, respectively. For example, the ECM 114 may determine a target throttle opening based on the target torque, and the throttle actuator module 116 may adjust opening of the throttle valve 112 based on the target throttle opening. The ECM 114 may also determine a target spark based on the target torque, and the spark actuator module 126 may generate spark based on the target spark timing.

The ECM 114 may also determine one or more target fueling parameters based on the target torque, and the fuel actuator module 124 may inject fuel based on the target fueling parameters. For example, the target fueling parameters may include fuel injection amount, number of fuel injections for injecting the amount, and timing for each of the injections. The ECM 114 may also determine target intake and exhaust cam phaser angles based on the target torque, and the phaser actuator module 158 may regulate the intake and exhaust cam phasers 148 and 150 based on the target intake and exhaust cam phaser angles, respectively. The ECM 114 may also determine a target boost based on the target torque, and the boost actuator module 164 may control boost output by the boost device(s) based on the target boost. The ECM 114 may also determine a target EGR value based on the target torque, and the EGR actuator module 172 may control opening of the EGR valve 170 based on the target EGR value.

The ECM 114 may operate the engine 102 in a variable cylinder deactivation mode when one or more enabling conditions are satisfied. For example only, the ECM 114 may operate in the variable cylinder deactivation mode when an engine torque is greater than a predetermined torque and/or less than a predetermined torque, when an engine speed is greater than a predetermined speed and/or less than a predetermined speed, when a gear engaged within a transmission is greater than a predetermined gear and/or less than a predetermined gear, and/or when one or more other suitable enabling conditions are satisfied.

N cylinders of the engine 102 can be deactivated during operation in the variable cylinder deactivation mode, where N is greater than or equal to zero and less than or equal to a total number of cylinders of the engine 102. The ECM 114 may determine a target effective cylinder count (ECC) based on the target torque. An ECC may refer to an average number of cylinders that are activated during a predetermined period including two or more sub-periods. For example, an ECC may refer to an average number of cylinders that are activated per engine cycle during a predetermined number of engine cycles. One engine cycle may correspond to the period necessary for all of the cylinders of the engine 102 to complete a combustion cycle, such as 2 crankshaft revolutions in a four-stroke engine. ECCs may be integer and non-integer values. The ECM 114 may also set a target cylinder activation/deactivation sequence for achieving the target ECC.

The cylinder actuator module 120 activates and deactivates cylinders to achieve the target ECC. The cylinder actuator module 120 deactivates the intake and exhaust valves of cylinders that are to be deactivated. The cylinder actuator module 120 allows opening and closing of the intake and exhaust valves of cylinders that are to be activated.

Fueling is halted (zero fueling) to cylinders that are to be deactivated, and fuel is provided the cylinders that are to be activated. Spark is provided to the cylinders that are to be activated. Spark may be provided or halted to cylinders that are to be deactivated. Cylinder deactivation is different than fuel cutoff (e.g., deceleration fuel cutoff) in that the intake and exhaust valves of cylinders to which fueling is halted during fuel cutoff are still opened and closed during fuel cutoff whereas the intake and exhaust valves are maintained closed when deactivated.

Figure 2:
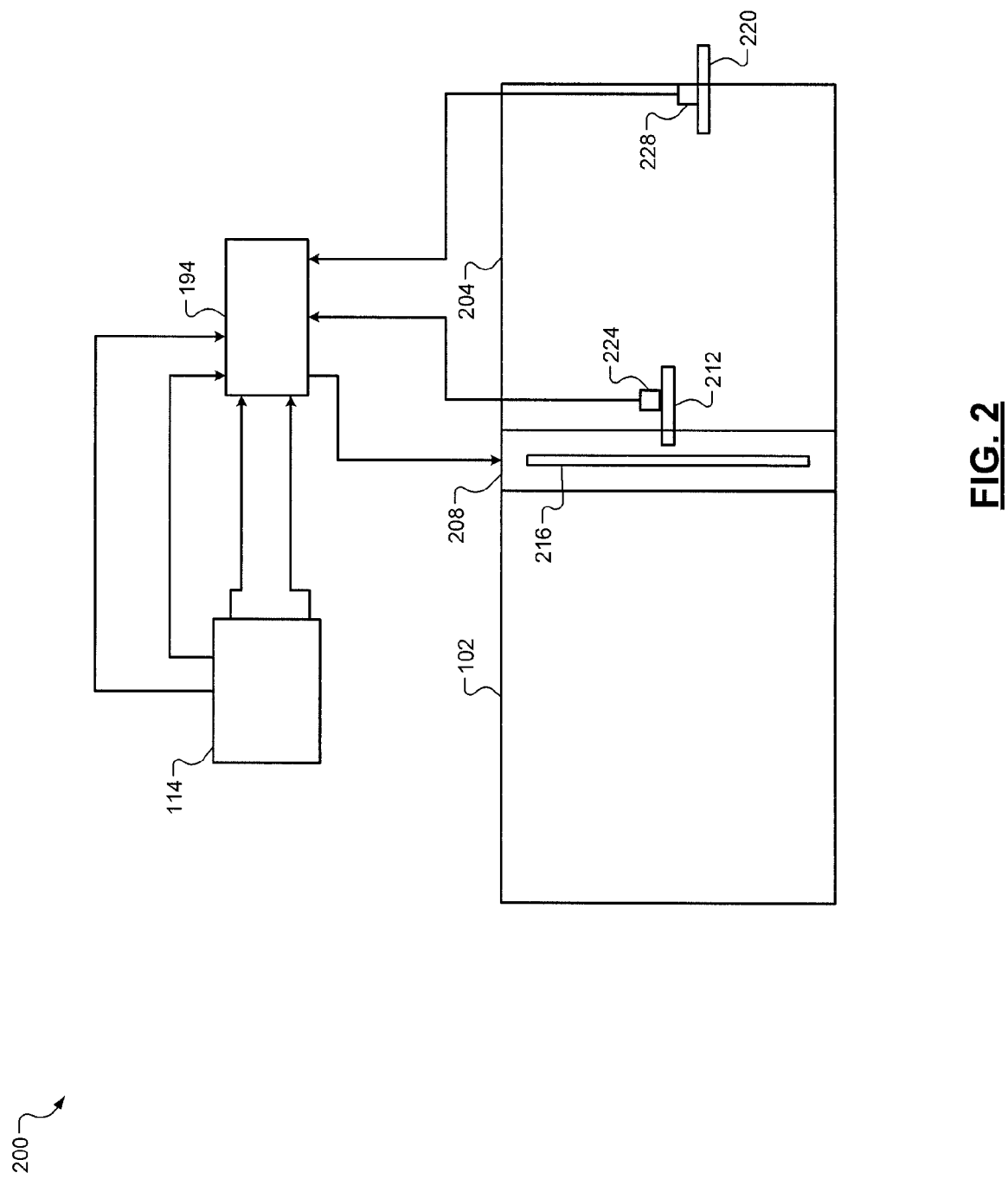
FIG. 2 is a functional block diagram of an example powertrain system according to the present disclosure.

FIG. 2 is a functional block diagram of an example powertrain system 200. Referring now to FIGS. 1 and 2, the engine 102 outputs torque to a transmission 204 via the a torque converter 208. The torque converter 208 includes a turbine and a pump. The pump is mechanically coupled to and rotates with an output shaft of the engine 102, such as the crankshaft. The pump includes blades or fins that direct transmission fluid within the torque converter 208 as the pump turns.

Like the pump, the turbine includes blades or fins. Transmission fluid output by the pump rotatably drives the blades or fins of the turbine. The turbine is mechanically coupled to an input shaft 212 of the transmission 204. Rotation of the turbine therefore causes rotation of the input shaft 212.

The torque converter 208 also includes a torque converter clutch (TCC) 216. The TCC 216 may be referred to as a lock-up clutch. Engagement and disengagement of the TCC 216 is controlled to lock and unlock the pump to and from the turbine, respectively. In other words, engagement and disengagement of the TCC 216 is controlled to lock and unlock the output shaft of the transmission to and from the input shaft 212 of the transmission 204.

Torque is transferred between the input shaft 212 and an output shaft 220 of the transmission 204 via gears. Torque is transferred between the transmission output shaft and wheels of the vehicle via one or more differentials, driveshafts, etc. Wheels that receive torque output by the transmission may be referred to as driven wheels. Wheels that do not receive torque from the transmission may be referred to as undriven wheels.

A rotational speed of the turbine may be measured using a turbine speed sensor 224. Since the turbine rotates with the input shaft 212, a rotational speed of the input shaft 212 may alternatively be measured. A rotational speed of the output shaft 220 may be measured using a transmission output shaft speed (TOSS) sensor 228.

The transmission control module 194 controls the TCC 216. The TCC 216 may be hydraulically controlled, mechanically controlled, or controlled in another suitable manner. Slip of the TCC 216 ("TCC slip") may refer to a difference between an engine speed (e.g., a rotational speed of the crankshaft) and the turbine speed.

The transmission control module 194 controls the TCC 216 based on a target TCC slip, and the transmission control module 194 determines the target TCC slip based on a torque of the engine 102, an ECC of the engine 102, the turbine speed, and a gear engaged within the transmission 204. Controlling the target TCC slip, and therefore the TCC 216, based on the ECC may minimize noise and vibration (N&V) associated with deactivating one or more cylinders of the engine 102.

Figure 3:
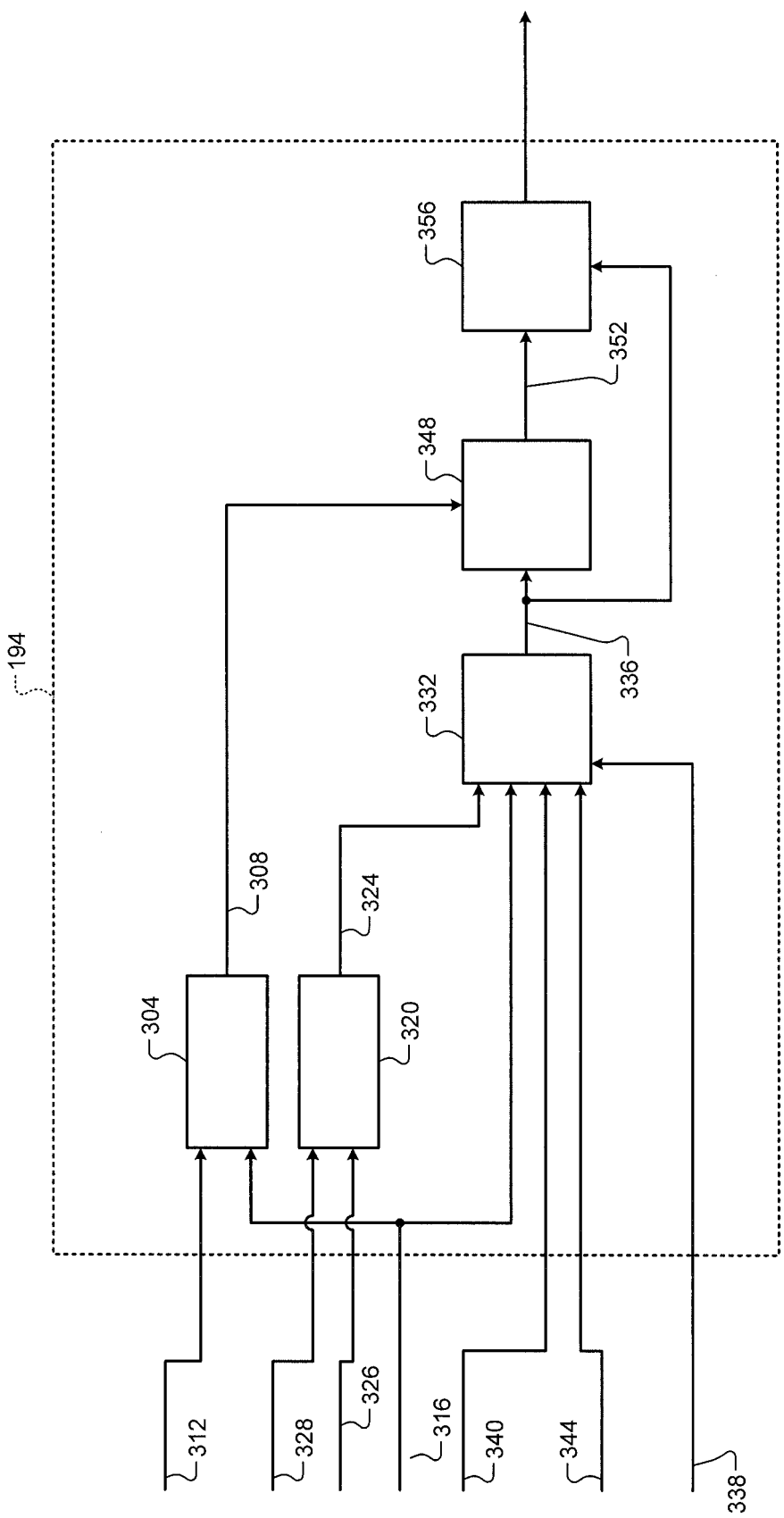
FIG. 3 is a functional block diagram of an example transmission control module according to the present disclosure.

Referring now to FIG. 3, a functional block diagram of an example implementation of the transmission control module 194 is presented. A TCC slip module 304 determines a TCC slip 308 based on an engine speed 312 and a turbine speed 316. For example, the TCC slip module 304 may set the TCC slip 308 equal to or based on a difference between the engine speed 312 and the turbine speed 316. The engine speed 312 may be determined, for example, by the ECM 114 based on signals from the crankshaft position sensor 180. The turbine speed 316 may be determined, for example, by the transmission control module 194 based on signals from the turbine speed sensor 224.

A gear determination module 320 determines a gear 324 for the transmission 204 based on an accelerator pedal position (APP) 326 and a transmission output shaft speed (TOSS) 328. More specifically, the gear determination module 320 determines the gear 324 based on the APP 326 and a vehicle speed. The vehicle speed may be determined based on the TOSS 328. The TOSS 328 may be determined, for example, by the transmission control module 194 based on signals from the TOSS sensor 228. The APP 326 may, for example, be provided by the ECM 114 based on signals from one or more APP sensors. In various implementations, the transmission 204 may include a gear sensor that monitors engagement of gears within the transmission 204 and generates the gear 324 accordingly.

A target TCC slip module 332 determines a target TCC slip 336. During operation in the variable cylinder deactivation mode, the target TCC slip module 332 determines the target TCC slip 336 based on the turbine speed 316, the gear 324, an ECC (effective cylinder count) 340 of the engine 102, and an engine torque 344. The target TCC slip module 332 may determine the target TCC slip 336, for example, using one or more functions and/or mappings that relate the turbine speed 316, the gear 324, the ECC 340, and the engine torque 344 to the target TCC slip 336. The ECC 340 may be, for example, the target ECC for a future predetermined period or an actual ECC of the engine 102 during a previous (e.g., last) predetermined period. The engine torque 344 may correspond to, for example, a present amount of torque at the crankshaft.

For example only, the target TCC slip module 332 may determine the target TCC slip 336 using a 4-input mapping of turbine speeds, gears, ECCs, and engine torques to the target TCC slip 336 using the turbine speed 316, the gear 324, the ECC 340, and the engine torque 344 to the target TCC slip 336 as inputs. Interpolation may be used for values between entries.

For another example only, the target TCC slip module 332 may select one of a plurality of table sets (sets of tables) based on the ECC 340. Each of the plurality of table sets corresponds to a predetermined ECC range between 0 and the total number of cylinders of the engine 102. The target TCC slip module 332 may select the one of the plurality of table sets that corresponds to the predetermined ECC range that the ECC 340 falls within.

Each of the plurality of table sets includes a plurality of gear tables that correspond to one possible value of the gear 324 or a predetermined range of possible values of the gear 324. The target TCC slip module 332 may select one of the gear tables based on the gear 324. Each of the gear tables includes a 2-input mapping of turbine speeds and engine torques to target TCC slip. The target TCC slip module 332 may determine the target TCC slip 336 using the selected one of the gear tables based on the turbine speed 316 and the engine torque 344. Interpolation may be used for values between entries. While the above examples have been provided, the target TCC slip module 332 may determine the target TCC slip 336 in another suitable manner based on or using the turbine speed 316, the gear 324, the ECC 340, and the engine torque 344 as inputs. The target TCC slip module 332 may increase the target TCC slip 336 as the ECC 340 decreases, and vice versa.

The ECM 114 may indicate whether operation in the variable cylinder deactivation mode is occurring or not via a mode signal 338. When the mode signal 338 indicates operation in the variable cylinder deactivation mode, the target TCC slip module 332 determines the target TCC slip 336 based on the turbine speed 316, the gear 324, the ECC 340, and the engine torque 344.

When the mode signal 338 indicates that variable cylinder deactivation mode is not in use, the target TCC slip module 332 may determine the target TCC slip 336 based on the turbine speed 316, the gear 324, and the engine torque 344. In other words, the target TCC slip module 332 may disable use of the ECC 340 in determining the target TCC slip 336 when the variable cylinder deactivation mode is not in use. The target TCC slip module 332 may determine the target TCC slip 336, for example, using one or more functions and/or mappings that relate the turbine speed 316, the gear 324, and the engine torque 344 to the target TCC slip 336.

A TCC slip error module 348 may determine a TCC slip error 352 based on the TCC slip 308 and the target TCC slip 336. For example, the TCC slip error module 348 may set the TCC slip error 352 equal to or based on a difference between the TCC slip 308 and the target TCC slip 336. A TCC slip control module 356 controls the TCC 216 based on the TCC slip error 352. For example only, the TCC slip control module 356 may selectively adjust engagement or disengagement of the TCC 216 to reduce the TCC slip error 352 toward or to zero. The TCC slip control module 356 may control the TCC 216 further based on the target TCC slip 336, for example, for feed-forward control.

Figure 4:
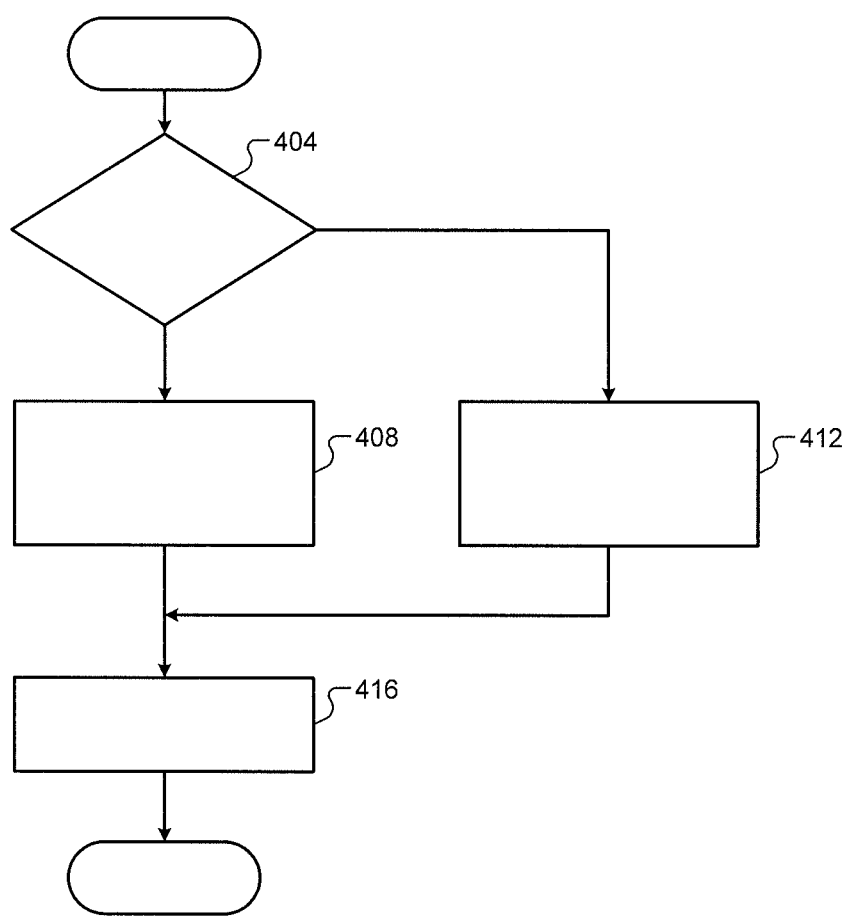
FIG. 4 is a flowchart depicting an example method of controlling torque converter clutch slip according to the present disclosure.

Referring now to FIG. 4, a functional block diagram of an example method of controlling TCC slip is presented. At 404, the target TCC slip module 332 may determine whether the variable cylinder deactivation mode is in use. If so, control may continue with 408. If false, control transfers to 412. At 408, the target TCC slip module 332 determines the target TCC slip 336 based on the turbine speed 316, the gear 324, the engine torque 344, and the ECC 340, as discussed above. At 412, the target TCC slip module 332 may determine the target TCC slip 336 based on the turbine speed 316, the gear 324, and the engine torque 344, as discussed above.

Control continues with 416 after 408 or 412. At 416, the TCC slip control module 356 controls the TCC 216 based on the target TCC slip 336 and the TCC slip error 352. For example only, the TCC slip error module 348 may determine the TCC slip error 352 based on a difference between the target TCC slip 336 and the TCC slip 308, and the TCC slip control module 356 may control the TCC 216 to adjust the TCC slip error 352 toward or to zero. The TCC slip control module 356 may control the TCC 216 further based on the target TCC slip 336, for example, for feed-forward control. While control is shown as ending, FIG. 4 is illustrative of one control loop, and a control loop may be executed, for example, every predetermined period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/ or rely on stored data. Non-limiting examples of the non-transitory tangible computer readable medium include nonvolatile memory, volatile memory, magnetic storage, and optical storage.

What is claimed is:

1. A torque converter clutch control system of a vehicle, comprising:
a target slip module that determines a target torque converter clutch slip based on an average number of activated cylinders of an engine during a predetermined period;
a slip error module that determines a slip error based on a difference between the target torque converter clutch slip and a slip of the torque converter clutch; and
a slip control module that controls a torque converter clutch based on the target torque converter clutch slip and the slip error.

2. The torque converter clutch control system of claim 1 wherein the slip control module controls the torque converter clutch to adjust the slip error toward or to zero.

3. The torque converter clutch control system of claim 1 further comprising a slip module that determines the slip of the torque converter clutch based on a difference between an engine speed and a torque converter turbine speed.

4. The torque converter clutch control system of claim 1 wherein the target slip module determines the target torque converter clutch slip further based on a torque output of the engine.

5. The torque converter clutch control system of claim 1 wherein the target slip module determines the target torque converter clutch slip further based on a gear engaged within a transmission of the vehicle.

6. The torque converter clutch control system of claim 1 wherein the target slip module determines the target torque converter clutch slip further based on a torque converter turbine speed.

7. The torque converter clutch control system of claim 1 wherein the target slip module determines the target torque converter clutch slip further based on a torque output of the engine, a gear ratio, and a torque converter turbine speed.

8. The torque converter clutch control system of claim 7 wherein the target slip module determines the target torque converter clutch slip using a mapping that relates the average number of activated cylinders, the torque output of the engine, the gear ratio, and the torque converter turbine speed to the target torque converter clutch slip.

9. The torque converter clutch control system of claim 1 wherein the target slip module increases the target torque converter clutch slip as the average number of activated cylinders decreases and decreases the target torque converter clutch slip as the average number of activated cylinders increases.

10. A torque converter clutch control method for a vehicle, comprising:
- determining a target torque converter clutch slip based on an average number of activated cylinders of an engine during a predetermined period;
- determining a slip error based on a difference between the target torque converter clutch slip and a slip of the torque converter clutch; and
- controlling a torque converter clutch based on the target torque converter clutch slip and the slip error.

11. The torque converter clutch control method of claim 10 further comprising controlling the torque converter clutch to adjust the slip error toward or to zero.

12. The torque converter clutch control method of claim 10 further comprising determining the slip of the torque converter clutch based on a difference between an engine speed and a torque converter turbine speed.

13. The torque converter clutch control method of claim 10 further comprising determining the target torque converter clutch slip further based on a torque output of the engine.

14. The torque converter clutch control method of claim 10 further comprising determining the target torque converter clutch slip further based on a gear engaged within a transmission of the vehicle.

15. The torque converter clutch control method of claim 10 further comprising determining the target torque converter clutch slip further based on a torque converter turbine speed.

16. The torque converter clutch control method of claim 10 further comprising determining the target torque converter clutch slip further based on a torque output of the engine, a gear ratio, and a torque converter turbine speed.

17. The torque converter clutch control method of claim 16 further comprising determining the target torque converter clutch slip using a mapping that relates the average number of activated cylinders, the torque output of the engine, the gear ratio, and the torque converter turbine speed to the target torque converter clutch slip.

18. The torque converter clutch control method of claim 10 further comprising:
- increasing the target torque converter clutch slip as the average number of activated cylinders decreases; and
- decreasing the target torque converter clutch slip as the average number of activated cylinders increases.

* * * * *